United States Patent
Saeidi et al.

(10) Patent No.: US 10,007,310 B2
(45) Date of Patent: Jun. 26, 2018

(54) CIRCUITS AND METHODS PROVIDING CALIBRATION FOR TEMPERATURE MITIGATION IN A COMPUTING DEVICE

(71) Applicant: QUALCOMM Incorporated, San Diego, CA (US)

(72) Inventors: Mehdi Saeidi, San Diego, CA (US); Melika Roshandell, Carlsbad, CA (US); Rajat Mittal, San Francisco, CA (US)

(73) Assignee: QUALCOMM Incorporated, San Diego, CA (US)

(*) Notice: Subject to any disclaimer, the term of this patent is extended or adjusted under 35 U.S.C. 154(b) by 123 days.

(21) Appl. No.: 15/205,678

(22) Filed: Jul. 8, 2016

(65) Prior Publication Data

US 2018/0011520 A1    Jan. 11, 2018

(51) Int. Cl.
*G06F 1/00* (2006.01)
*G06F 1/20* (2006.01)
*G06F 1/32* (2006.01)

(52) U.S. Cl.
CPC ............ *G06F 1/206* (2013.01); *G06F 1/3287* (2013.01)

(58) Field of Classification Search
CPC ......... G06F 1/206; G06F 1/324; G06F 1/3234
See application file for complete search history.

(56) References Cited

U.S. PATENT DOCUMENTS

| | | | | |
|---|---|---|---|---|
| 5,940,785 A | * | 8/1999 | Georgiou | G06F 1/206 713/322 |
| 7,461,272 B2 | | 12/2008 | Rotem et al. | |
| 2002/0087904 A1 | * | 7/2002 | Cai | G06F 1/206 713/322 |
| 2004/0233930 A1 | | 11/2004 | Colby | |
| 2008/0244294 A1 | * | 10/2008 | Allarey | G06F 1/3203 713/320 |
| 2010/0115304 A1 | * | 5/2010 | Finkelstein | G06F 1/206 713/320 |
| 2013/0091348 A1 | | 4/2013 | Kwon et al. | |
| 2014/0236380 A1 | | 8/2014 | Alton et al. | |
| 2014/0249690 A1 | | 9/2014 | Park et al. | |
| 2015/0346745 A1 | | 12/2015 | Dasnurkar et al. | |
| 2015/0347203 A1 | | 12/2015 | Yang et al. | |
| 2017/0357298 A1 | * | 12/2017 | Hovis | G06F 1/206 |

OTHER PUBLICATIONS

International Search Report and Written Opinion—PCT/US2017/037502—ISA/EPO—dated Aug. 21, 2017.

* cited by examiner

*Primary Examiner* — Xuxing Chen
(74) *Attorney, Agent, or Firm* — Haynes and Boone, LLP (57) ABSTRACT

A method includes generating temperature information from a plurality of temperature sensors within a computing device; and processing the temperature information to generate voltage reduction steps based on an observed rate of change of the temperature information.

26 Claims, 7 Drawing Sheets

365

| PMIC Steps | Ramp Rate ( °C/s ) | |
|---|---|---|
| 15mV | 25 C Tj increase in first 100 ms of test | —410 |
| 25mV | 35 C Tj increase in first 100 ms of test | —420 |
| 45mV | 45 C Tj increase in first 100 ms of test | —430 |
| 65mV | 55 C Tj increase in first 100 ms of test | —440 |

CIRCUITS AND METHODS PROVIDING CALIBRATION FOR TEMPERATURE MITIGATION IN A COMPUTING DEVICE

TECHNICAL FIELD

The present application relates, generally, to thermal management of a computing device and, more specifically, to calibrating temperature mitigation algorithms in computing devices.

BACKGROUND

A conventional computing device (e.g., smart phone, tablet computer, etc.) may include a system on chip (SOC), which has a processor and other operational circuits. Specifically, an SOC in a smart phone may include a processor chip within a package, where the package is mounted on a printed circuit board (PCB) internally to the phone. The phone includes an external housing and a display, such as a liquid crystal display (LCD). A human user when using the phone physically touches the external housing and the display.

As the SOC operates, it generates heat. In one example, the SOC within a smart phone may reach temperatures of 80° C.-100° C. Furthermore, conventional smart phones do not include fans to dissipate heat. During use, such as when a human user is watching a video on a smart phone, the SOC generates heat, and the heat is spread through the internal portions of the phone to the outside surface of the phone.

The outside surface of the phone is sometimes referred to as the "skin." The outside surface includes the part of the external housing that is physically on the outside of the phone as well as any other externally-exposed portions, such as an LCD display. It is generally accepted that the skin of the phone should not reach temperatures higher than about 40° C.-45° C. due to safety and ergonomic reasons. As noted above, the SOC within the smart phone may reach temperatures of 80° C.-100° C., although the temperature of the SOC is not felt directly at the skin of the phone. Instead, heat dissipation within the phone often means that the skin temperature of the phone is at a lower temperature than the SOC temperature. Furthermore, whereas changes to SOC temperature may be relatively quick (e.g., seconds), changes to device skin temperature may be relatively slow (e.g., tens of seconds or minutes).

Conventional smart phones include algorithms to control both the SOC temperature and the skin temperature by reducing a frequency of operation of the SOC when a temperature sensor on the SOC reaches a threshold level. Additionally, the physical properties of a smart phone model and of an individual smart phone itself affect the thermal performance of a smart phone. For instance, a smart phone with a thin form factor is generally expected to experience high skin temperatures more quickly than would a smart phone having a thick form factor. In an additional example, a smart phone model having an air gap or heat spreader between its processor and its skin would generally be expected to experience high skin temperatures more slowly than would a smart phone not having an air gap or heat spreader. Also, manufacturing imperfections and defects may affect the thermal performance of a given smart phone by affecting thermal resistance and heat paths between a smart phone processor and its skin.

SUMMARY

According to one embodiment, a method includes generating temperature information from a plurality of temperature sensors within a computing device, and processing the temperature information to generate voltage reduction steps based on an observed rate of change of the temperature information.

According to another embodiment, a system includes: a computer processor configured to execute computer-readable instructions, the computer processor being installed in a computing device; and a temperature sensing device disposed within the computing device, the temperature sensing device being in communication with the computer processor, the computer processor configured to perform the following operation: receiving temperature information from the temperature sensing device, calculating a junction temperature ramp rate value from the temperature information, and setting voltage reduction steps based on the junction temperature ramp rate value.

According to another embodiment, a computing device includes: means for sensing temperature at a plurality of locations within an external housing of the computing device, means for calculating a junction temperature ramp rate from temperature data from the temperature sensing means, means for parsing a look-up table to select a voltage reduction step size value based on the junction temperature ramp rate, and means for reducing an operating voltage by the voltage reduction step size value.

According to another embodiment, a method includes: gathering temperature data from a plurality of temperature sensors internal to a housing of a computing device during a first period of time, measuring a temperature ramp rate of the computing device from the temperature data, using the temperature ramp rate as a key to select a value from a data structure, wherein the value includes a voltage step size, and reducing an operating voltage of the computing device by the voltage step size.

DETAILED DESCRIPTION

Various embodiments provided herein include systems and methods to calibrate temperature mitigation of a computing device. For instance, various embodiments described herein capture physical properties of a manufactured computing device and use those physical properties to calibrate a temperature mitigation process of the computing device.

In one embodiment, a computer processor includes a number of integrated circuit chips (e.g., a SOC that has a number of processing cores, a power management integrated circuit (PMIC), and the like). The chips are disposed within a computing device, such as a smart phone. The computing device also includes a battery, a printed circuit board hosting the chips, a touchscreen display, and an outer housing, among other things. The power supply, e.g., a PMIC, converts the voltage and current from the battery into a voltage and current that can be used by the other chips. As the chips operate, they produce heat.

The heat from the chips spreads throughout the computing device according to the heat conduction properties of the physical materials that make up the computing device. However, it is generally expected that the skin of the computing device will not be as hot as the chips, at least under usual operating conditions. The system includes one or more processes that monitor temperature sensors within the chips and on the printed circuit board and reduce an operating frequency and/or an operating voltage of one or more of the chips to mitigate a chip temperature and/or a skin temperature.

The physical properties of the computing device affect how a temperature mitigation algorithm may be used effectively. For instance, some computing devices may have physical heat conduction properties that allow a skin temperature to rise relatively quickly. In another example, a computing device may have physical heat conduction properties that allow a temperature detected at a chip or on the printed circuit board to rise relatively quickly. The rate of change of a temperature is referred to in these examples as a ramp rate, so that a manufactured computing device having a relatively high ramp rate has a high rate of change of a temperature detected on the chip or board or calculated for the skin.

In one example embodiment, after the computing device is manufactured, one or more of the chips runs a computing benchmarking test while monitoring temperature readings throughout the chip and the board. The computing device itself tracks its performance during the benchmarking test, including a number of instructions executed, a time to mitigation under default thermal mitigation settings, temperature ramp rates, and the like. The temperature ramp rates and time to mitigation provide an indication of the thermal properties of the computing device. The computing device processes the temperature information and the other results of the computing benchmarking test to generate parameter values for a temperature mitigation algorithm of the smart phone. For instance, the processor may set junction temperature set points, skin temperature set points, frequency and temperature adjustment increments, temperature sensor polling rates, and the like based on the data from the benchmarking test.

Such calibration may be performed at any appropriate time, such as after manufacture but before shipping, on a periodic basis such as once a year, or at other times. Various embodiments may provide advantages over conventional systems and techniques. For instance, various embodiments described herein may provide for a device-specific temperature mitigation algorithm by using the physics of a particular device to set its temperature mitigation algorithm. This is in contrast to conventional systems which may use a same temperature mitigation algorithm for every phone that uses a same chip or for every individual phone built under a same model number. Accordingly, various embodiments described herein may better adapt temperature mitigation to the individual properties of a device that may result from manufacture variance, damage during use, and the like.

Figure 3:
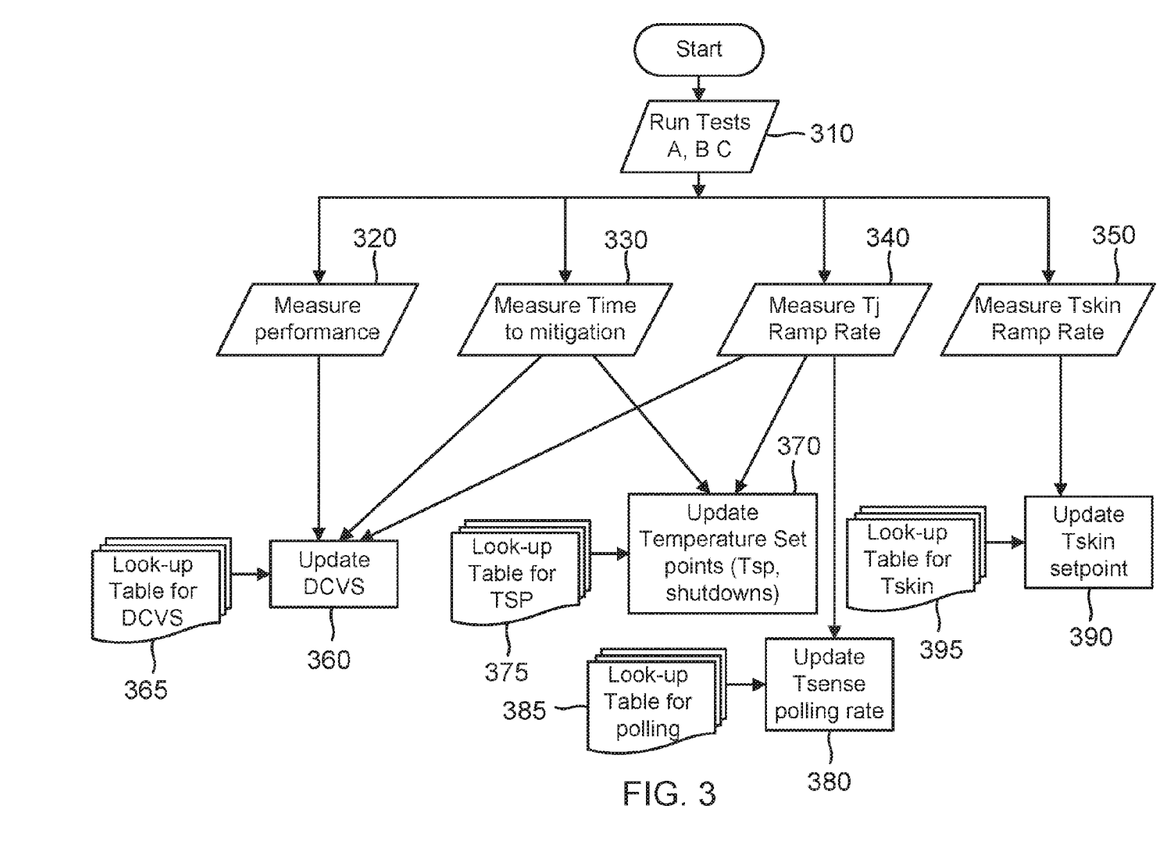
FIG. 3 is an illustration of an example calibration method for a temperature mitigation algorithm to be use of the computing device of FIG. 1.

Various embodiments may be performed by hardware and/or software in a computing device. For instance, some embodiments include hardware and/or software algorithms performed by a processor, which can be part of an SOC, in a computing device as the device operates. Adjusting the thermal algorithm parameter values includes storing data in a computer readable medium. For instance, various embodiments may include nonvolatile or volatile memory set aside in an integrated circuit chip in a computing device to store junction temperature set points, skin temperature set points, voltage and frequency reduction step values, and temperature sensor polling rates. FIG. 3, below, provides an overview of an example process.

Figure 1:
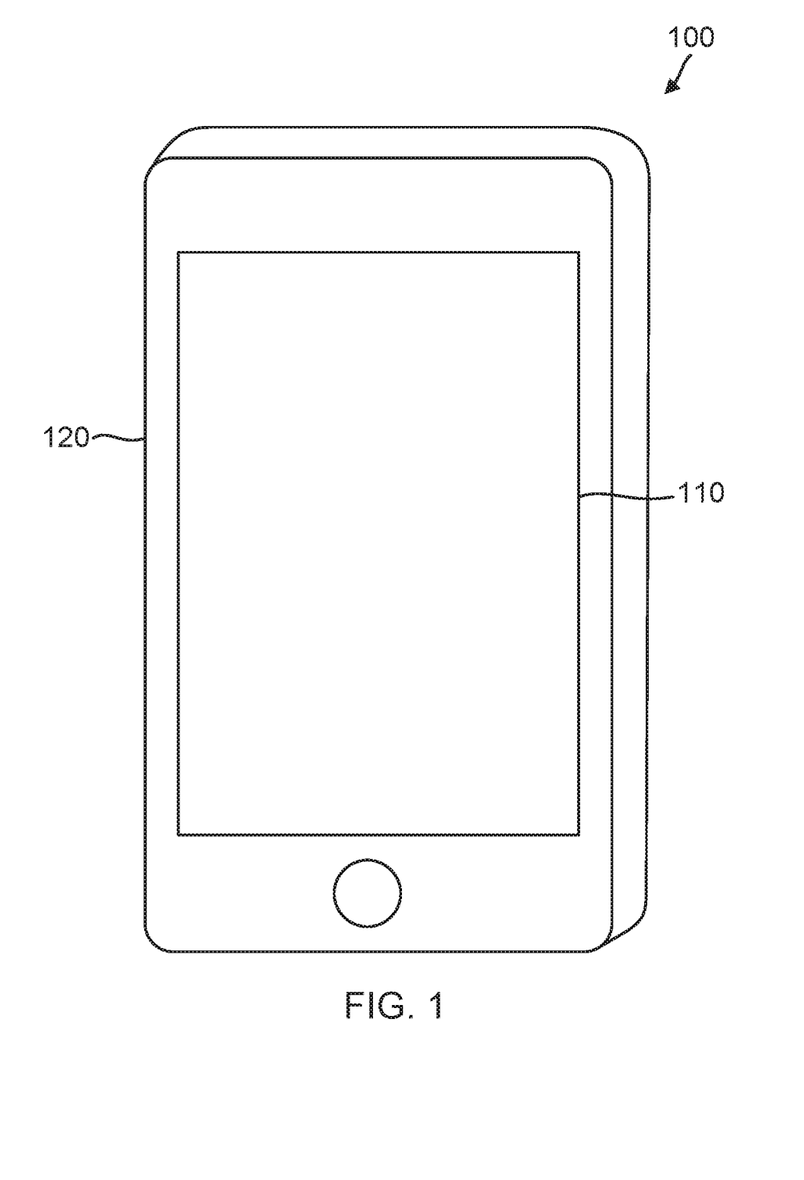
FIG. 1 is an illustration of an example computing device that may perform a method according to various embodiments.

FIG. 1 is a simplified diagram illustrating an example computing device 100 in which various embodiments may be implemented. In the example of FIG. 1, computing device 100 is shown as a smart phone. However, the scope of embodiments is not limited to a smart phone, as other embodiments may include a tablet computer, a laptop computer, or other appropriate device. In fact, the scope of embodiments includes any particular computing device, whether mobile or not. Embodiments including battery-powered devices, such as tablet computers and smart phones may benefit from the concepts disclosed herein. Specifically, the concepts described herein provide techniques to manage heat that is produced inside of computing device 100 and also dissipated outside of computing device 100, thereby providing comfort and safety for a human user and conserving battery power.

As shown in FIG. 1, computing device 100 includes an outer surface or skin 120, which may be expected to come into contact with hands or other parts of the body of a human user. The outside surface 120 includes, e.g., metal surfaces and plastic surfaces and the surfaces that make up display unit 110. In one example, display unit 110 includes a capacitive liquid crystal display (LCD) touchscreen, which can be made of glass, plastic, sapphire, or plastic-coated glass, etc. The outside surface 120 therefore includes the various external surfaces such as the display unit 110 and the other parts of the external housing. The back cover of computing device 100 includes another part of the outer surface of the device, and specifically another part of the exterior housing, which may be arranged in a plane parallel to a plane of display unit 110.

Figure 2:
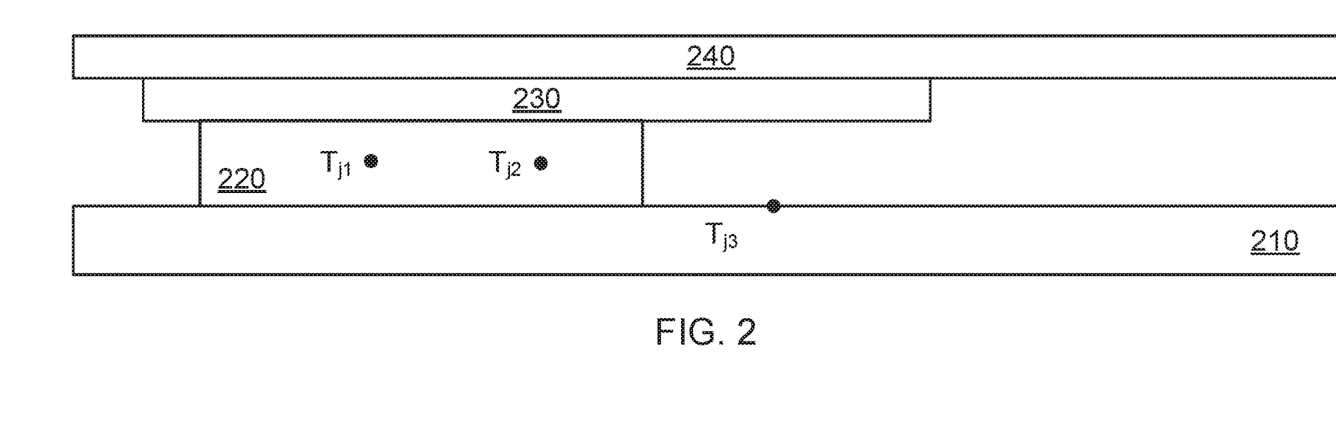
FIG. 2 is an illustration of an example internal architecture of the computing device of FIG. 1, according to one embodiment.

FIG. 2 illustrates an example arrangement of some external and internal components of computing device 100, according to one embodiment. In this example, the computer processor of the computing device is implemented in a system on chip (SOC) within a package 220, and the package 220 is mounted to a printed circuit board 210 and disposed within the physical housing of computing device 100. A heat spreader and electromagnetic interference (EMI) layer 230 is disposed on top of SOC package 220, and the back cover 240 is disposed over the layer 230. The package 220 including the processor can be mounted in a plane parallel to a plane of the display surface and a plane of the back cover 240.

Although not shown in FIG. 2, it is understood that computing device 100 may include other components, such as a battery, other printed circuit boards, other integrated circuit chips and the chip packages, and the like. The battery, the printed circuit boards, and the integrated circuit chips are disposed within the computing device 100 so that they are enclosed within the physical housing of the computing device 100 as indicated by exterior surface 120.

As the computer processor and other chips operate, they produce heat, which dissipates throughout the physical structure of computing device 100. Depending on the specific thermal properties of computing device 100, heat from the operation of the processor within SOC package 220 may reach uncomfortable or near-uncomfortable temperatures on the outside surface 120 of computing device 100, and runaway heat events may threaten the integrity of the package 220 or the semiconductor devices within package 220. Accordingly, computing device 100 includes temperature sensors located throughout. Example temperature sensors are shown labeled $T_{J1}$, $T_{J2}$, and $T_{J3}$. Temperature sensors $T_{J1}$ and $T_{J2}$ are implemented within the SOC of the package 220, whereas the temperature sensor labeled $T_{J3}$ is implemented on a surface of printed circuit board 210.

Various embodiments may include any number of temperature sensors as appropriate. For instance, an SOC may include a plurality of cores, such as a central processing unit (CPU), a graphics processing unit (GPU), a camera core, modem core, and the like. In such an embodiment, each core may include at least one (and possibly more) temperature sensors. Such an arrangement may be advantageous because different cores will run at different times and at different intensities, depending on a given application.

$T_J$ stands for junction temperature, and at any given time a junction temperature refers to a highest temperature reading by any of the sensors. For instance, if the temperature sensor $T_{J2}$ reads the highest temperature out of the three temperature sensors, then the value of that temperature reading is the junction temperature. As computing device 100 operates, the junction temperature may change, and the particular sensor reading the junction temperature may change. Furthermore, while computing device 100 does not include a temperature sensor on back cover 240 or display 110, the processor within SOC package 220 may include algorithms to calculate a skin temperature (Tskin) based on temperature readings from the sensors $T_{J1}$-$T_{J3}$.

The computer processor within SOC package 220 provides functionality to control the heat produced within computing device 100 by one or more algorithms to monitor the temperatures at the various sensors, including a junction temperature, and to take appropriate action. For instance, one or more algorithms may track the temperatures at the temperature sensors and reduce a voltage and/or a frequency of operation of the processor in the package 220 when the junction temperature exceeds one or more set points. Similarly, the same or similar algorithm may track a value for Tskin and may reduce a voltage and/or a frequency of operation of the processor in the package 220 when Tskin exceeds one or more set points.

FIG. 3 is an illustration of process 300 for calibrating a temperature mitigation algorithm, adapted according to one embodiment. The process begins at action 310, "Run Tests A, B, C." Some embodiments may include running a single computing benchmark test or more than one benchmark test, and any number of benchmark tests as may be appropriate may be run in various embodiments. An example test includes Dhrystone Million Instructions Per Second (DMIPS), which includes running a variety of test patterns on a smart phone or other processing device and recording the results.

As the one or more benchmarking tests are run on the computing device, the computing device may lower an operating frequency and/or an operating voltage according to default settings in a temperature mitigation algorithm. An example temperature mitigation algorithm that may be used in some embodiments includes Dynamic Clock and Voltage Scaling (DCVS), wherein a temperature mitigation algorithm checks temperature sensors according to a polling rate and then lowers an operating frequency and an operating voltage according to $T_J$ set points and Tskin set points. As $T_J$ and/or Tskin decreases, the algorithm may increase the operating frequency and/or operating voltage. Furthermore, the operating frequency and/or operating voltage are raised or lowered according to set steps or increments, as explained in more detail below. The various embodiments may include using any temperature mitigation algorithm, and DCVS is mentioned here as an example.

As the computing device runs the benchmarking tests, the temperature mitigation algorithm may cause fewer instructions per second to be executed by virtue of lowering the operating frequency. Therefore, a computing device with less desirable heat conduction properties may experience more thermal mitigation activity and thereby execute fewer instructions per second than would another computing device having more desirable heat conduction properties and running the same temperature mitigation algorithm. As a computing device runs the benchmarking tests, it records a number of instructions executed, a time before mitigation happens, $T_J$ ramp rates, Tskin ramp rates, and any other helpful values.

While running the tests (action 310) or subsequent to running the tests (action 310), one or more of actions 320-350 may be performed. Action 320, "Measure performance," includes recording and/or processing test results indicating computing performance, such as millions of instructions per second. Action 330, "Measure Time to mitigation," includes recording and/or processing test results indicating of an amount of time that the computing device was allowed to run before the mitigation algorithm slowed processing by reducing an operating frequency, reducing a voltage, or the like. Additionally, method 300 further includes action 340, "Measure $T_J$ Ramp Rate," which includes recording and/or processing test results indicating the rate of change of temperature at the internal temperature sensors of the device. Greater ramp rates typically indicate that performance is mitigated sooner in time than in computing devices with lower ramp rates. Action 350 "Measure Tskin Ramp Rate," includes using a skin temperature estimating algorithm that is based on temperature sensor algorithms and calculating a ramp rate for the skin temperature. The measured values at actions 320-350 may be used to calibrate the temperature mitigation algorithm and the subsequent actions.

Method 300 further includes actions 360, 370, 380, and 390 for updating parameters of the temperature mitigation algorithm according to the measured values at actions 320-350. For instance, action 360 includes updating the voltage and frequency steps used by the DCVS algorithm. In this example, the DCVS algorithm uses a particular step size for reducing or increasing voltage, and that step size is selected based on a number of factors, including $T_J$ ramp rate and/or Tskin ramp rate.

Continuing with the example, as the benchmark test runs, the computer processor tracks the $T_J$ ramp rate. With that ramp rate measured and saved, the computer processor then selects a voltage step size from look-up table 365 and uses that step size in the DCVS algorithm.

Figure 4:
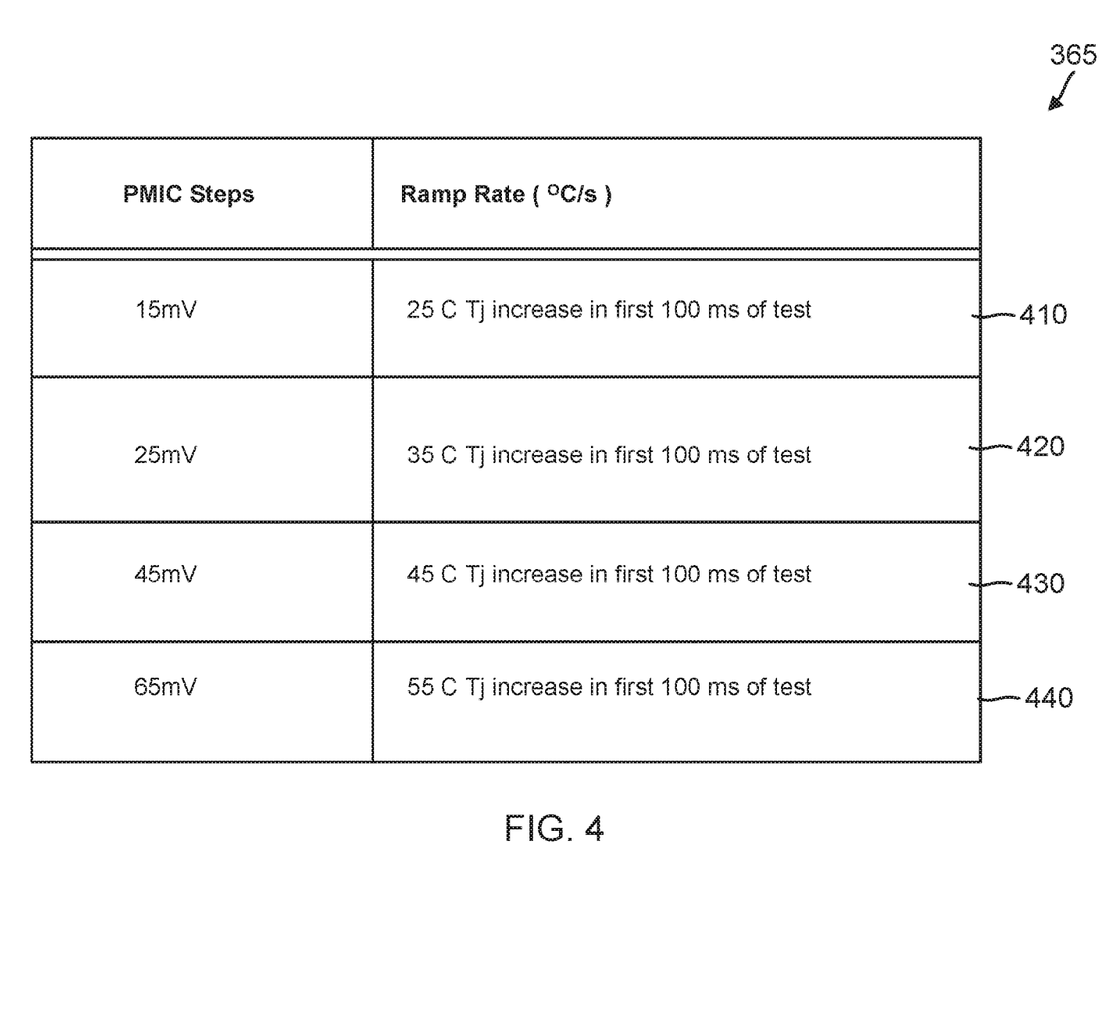
FIG. 4 is an illustration of an example look-up table that may be used to calibrate a temperature mitigation algorithm according to a temperature rates of change, such as junction temperature ramp rates and skin temperature ramp rates, according to one embodiment.

An example look-up table is illustrated at FIG. 4, according to one embodiment. In FIG. 4, the look-up table 365 includes a left hand column, which provides a selection of step sizes in millivolts. A right-hand side column provides ramp rate measurements in degrees Celsius per second. Each of the rows assigns a particular sized voltage step to a measured ramp rate. For instance, entry 410 assigns a 15 mV step size to a measured 25° C. per second ramp rate. Similarly, entry 440 assigns a 65 mV step size to a measured ramp rate of 55° C. per second. The other entries 420, 430 are intermediates between the top end and bottom end entries 440 and 410, respectively. Of course, table 365 illustrated in FIG. 4 is an example. It is understood that other embodiments may include more or fewer entries, different step sizes, and different ramp rates appropriate for a particular application.

Figure 5:
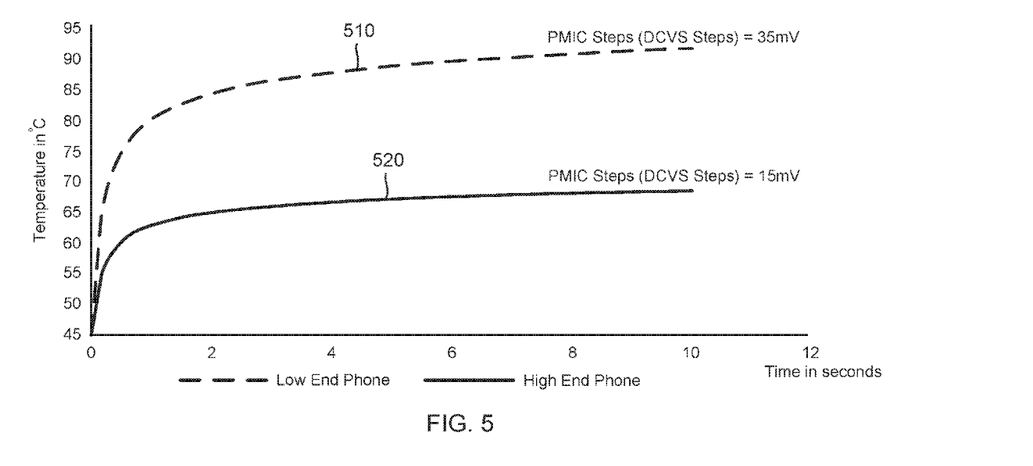
FIG. 5 is an illustration of an example temperature ramp rates of a computing device, according to one embodiment.

FIG. 5 illustrates example ramp rates according to one embodiment. The ramp rates include a temperature change over a defined time period, such as the duration of the benchmarking test. Curve 510 illustrates an example ramp rate that might be associated with a lower end computing device that has less desirable thermal conductive properties. In the example of curve 510, the conduction properties of the computing device allow the junction temperature or a calculated Tskin to rise relatively quickly. By contrast, curve 520 illustrates an example ramp rate that might be associated with a higher end computing device that has more desirable thermal conductive properties. In curve 520, the junction temperature and/or the skin temperature rises less quickly. In the present example, a higher junction temperature ramp rate or Tskin ramp rate would be associated with larger voltage steps in order to control temperature to an acceptable level. Accordingly, curve 510 is associated with a larger voltage step (35 mV) than is curve 520 (15 mV). This is consistent with the example look-up table 365 of FIG. 4, in which higher temperature ramp rates are associated with larger voltage steps.

Returning to the example of FIG. 3, at action 360 the computer processor receives the $T_J$ ramp rate measurement from action 340 and then compares the $T_J$ ramp rate measurement value to the entries in look-up table 365. Action 360 includes making an approximate match between the measured value for the $T_J$ ramp rate and the available entries in table 365, including by rounding up or down, finding a closest match, or using another selection criterion. Accordingly, action 360 includes parsing the data structure (in this case, table 365) to match the observed $T_J$ ramp rate to a $T_J$ ramp rate value in the table, selecting the voltage step value that corresponds to the $T_J$ ramp rate value in the table, and then applying the voltage step value to the DCVS algorithm. Of course, other embodiments may match an observed Tskin ramp rate with entries in a table and apply a corresponding voltage step size in addition to or alternatively to using junction temperature. In other words, setting a voltage reduction step size based on Tskin in other embodiments works similarly to action 360 using junction temperatures.

Figure 6:
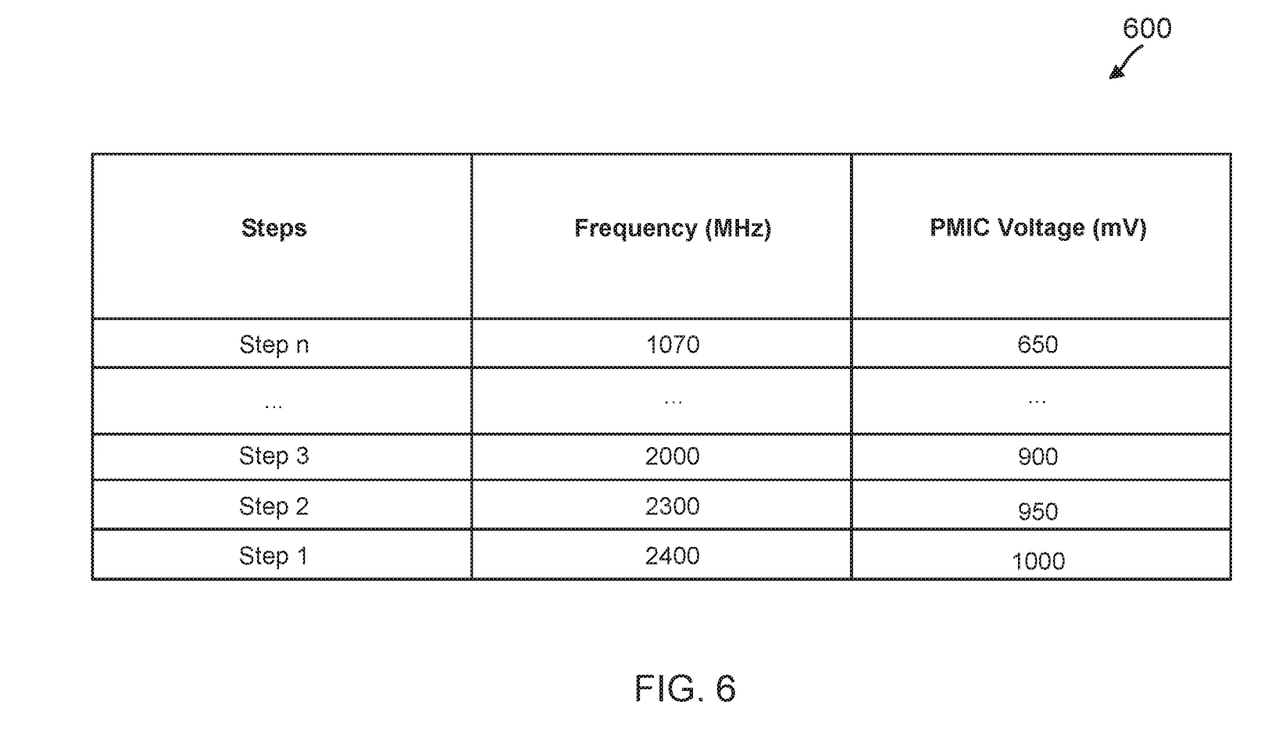
FIG. 6 is an illustration of an example of voltage reduction steps that may be applied by a temperature mitigation algorithm, according to one embodiment.

FIG. 6 is an illustration of DCVS behavior during normal operation, according to one embodiment. Specifically, action 360 may include selecting and applying an appropriate voltage step size from look-up table 365 during calibration; later, during normal operation, the DCVS algorithm exhibits a behavior similar to that illustrated in FIG. 6 as it uses the applied voltage step size.

FIG. 6 shows table 600 having three columns, wherein the right hand column illustrates 50 mV voltage steps. Specifically, the difference between step 1 and step 2 is 50 mV, and there is a 50 mV voltage delta between step 2 and step 3 as well. The steps between step 3 and step n are not specifically illustrated to indicate that the behavior of FIG. 6 may include any number of steps. Although step n is associated with 650 mV, it is understood that the high and low ends of the behavior may be set to any appropriate voltage level in various embodiments.

The middle column indicates frequency values that are associated with respective voltage levels and steps. Generally, it is expected that operation at lower voltage is associated with operation at lower clock frequencies to ensure that data bits are captured properly. Accordingly, the embodiment of FIG. 6 associates lower operating frequencies with lower operating voltages. Various embodiments may raise and lower voltages and clock frequencies as appropriate.

For instance, each of the rows in FIG. 6 may correspond to an action taken by the temperature mitigation algorithm. So in one example, when a first temperature set point ($T_J$ or Tskin) is exceeded by a rising temperature reading the temperature mitigation algorithm may go to step 1 and continue monitoring. If the temperature continues to increase or stays the same for more than a particular period of time, then the temperature mitigation algorithm may move to step 2 and continue monitoring, either continuing to further decrease the voltage or to begin increasing the voltage after temperature stabilizes or begins to decrease.

Action 360 may also include selecting a voltage step size based on the performance measure or time to mitigation, wherein a smaller time to mitigation may be associated with larger voltage steps and wherein a higher measured performance may be associated with larger voltage steps.

Action 370 includes updating temperature set points and shutdown points based at least in part on $T_J$ ramp rates (action 340) and time to mitigation (action 330). Set points include temperature reading values at the various temperature sensors at which a mitigation algorithm, such as DCVS, may be invoked. Generally, a shorter time to mitigation and a greater ramp rate will lead to lower temperature set points. Action 370 may be similar to action 360, in that the computer processor receives the values from actions 330, 340 and matches those values to look-up table 375. Action 370 then applies entries from the look-up table as temperature set points.

Action 370 may further include updating shutdown points. In this example, the shutdown points include temperature reading values at which integrated circuit chips may be turned off entirely to avoid runaway heat events. Generally, a shorter time to mitigation and a greater ramp rate will lead to lower shutdown points. Action 370 includes the computer processor receiving the values from actions 330, 340 and matching those values within look-up table 375 to identify appropriate shutdown points and to apply those shutdown points to the temperature mitigation algorithm.

Action 390 includes updating skin temperature set points in response to measured Tskin ramp rates from action 350. Action 390 includes the computer processor receiving values from action 350 and matching those values to entries in look-up table 395. Action 390 then applies entries selected from the look-up table 395 as skin temperature set points in the mitigation algorithm. Skin temperature set points may include temperature values corresponding to Tskin estimations. As the computer device operates during normal operation, it may also calculate Tskin, and when Tskin exceeds a set point, temperature mitigation may be performed by reducing operating voltage and/or operating frequency as described above.

Action 380 includes receiving $T_J$ ramp rate measurements and matching those measurements to values in look-up table 385 to identify appropriate polling rate values. In this example, polling rates include a frequency for acquiring temperature data from the temperature sensors. It is generally assumed that greater junction temperature ramp rates should correspond to higher polling rates for the temperature sensors. Action 380 includes using measured $T_J$ ramp rate information to identify appropriate polling rates and applying those polling rates to the temperature mitigation algorithm.

The embodiments may include performing the method 300 during the manufacturing process of a particular smart phone or other computing device. This allows the thermal policies of the particular device to be set on an individual basis for that device. The method 300 may then be re-run as appropriate, such as once a year or at other times, to adjust thermal policies. By contrast, various conventional processes include setting thermal policies for device models, so that each device of that particular model includes a same thermal policy.

An advantage of some embodiments using method 300 to calibrate a temperature mitigation algorithm is that those embodiments may apply settings particular to a given manufactured computing device. For instance, a given manufactured computing device may have manufactured variance, such as an air gap between a chip package and a heat spreader, which affects the heat conduction properties of the computing device. Method 300 runs a benchmarking test and then performs calibration to identify appropriate settings for that manufactured computing device. Other computing devices manufactured the same facility and even using the same model number may have different heat conduction characteristics due to manufacturing variance and may accordingly include somewhat different temperature mitigation settings more favorable for those individual devices.

Figure 7:
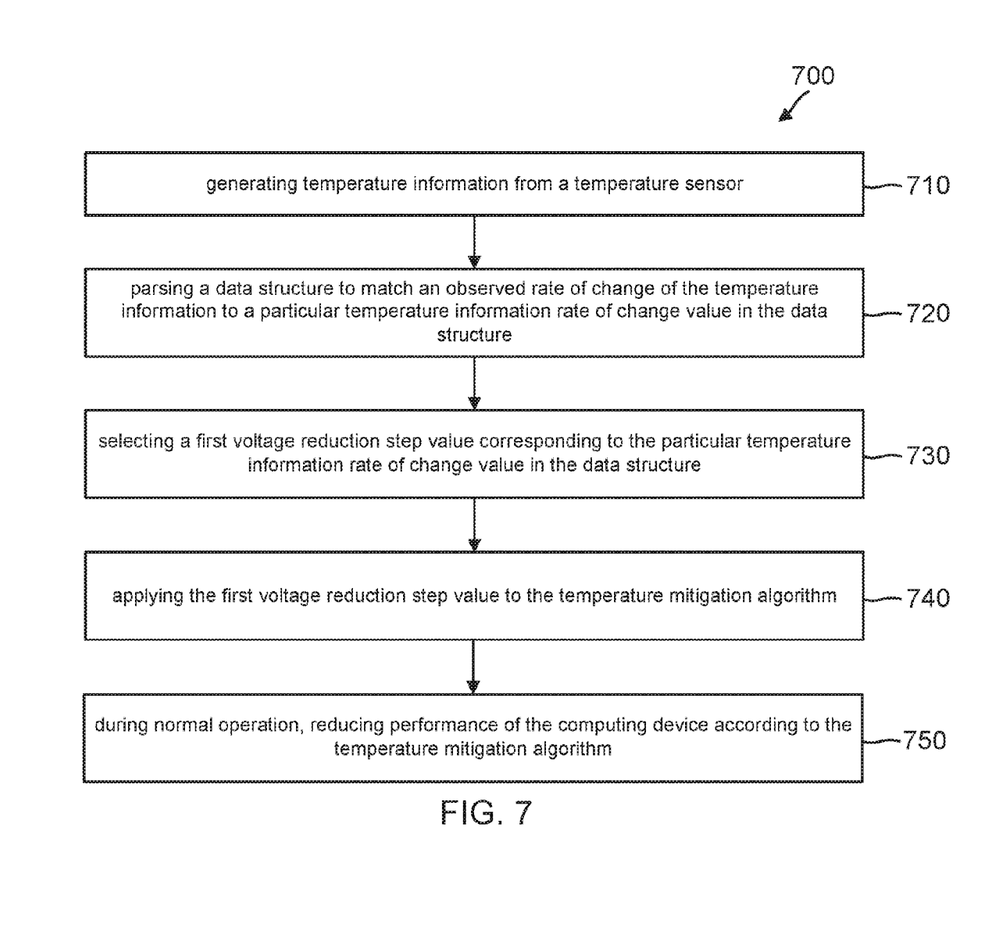
FIG. 7 is an illustration of a flow diagram of an example method of thermal mitigation.

A flow diagram of an example method 700 of providing thermal mitigation is illustrated in FIG. 7. In one example, method 700 is performed by a thermal management unit, which may include hardware and/or software functionality at a processor of the computing device. In some examples, a thermal management unit includes processing circuitry that executes computer readable instructions to receive temperature data from temperature sensors in the computing device and to perform a calibration function and a temperature mitigation function according to a particular algorithm.

The embodiment of FIG. 7 includes performing actions 710-740 during a calibration operation. For instance, action 710-740 may be performed in response to running a computing benchmarking test and capturing values during that computing benchmarking test. Action 750 may be performed during normal operation, using the calibrated temperature mitigation algorithm.

At action 710, the thermal management unit reads temperature sensing data from the temperature sensors at the integrated circuit chips and on the printed circuit board. Examples are shown above at FIG. 2, where temperature sensors are indicated as $T_{J1}$-$T_{J3}$. Action 710 in this example may include polling the temperature sensors at a default rate during a computing benchmarking test. Action 710 may also include measuring performance, measuring a time to mitigation using default temperature mitigation settings, measuring a $T_J$ ramp rate, and measuring a Tskin ramp rate, as described above with respect to actions 320-350 of FIG. 3.

At action 720, the thermal management unit parses a data structure to match an observed rate of change of the temperature information to a particular temperature information rate of change value in the data structure. For instance, in the examples above, the rate of change of the temperature information includes a ramp rate. Further in the example above, the thermal management unit examines a look-up table using the $T_J$ ramp rate (or the Tskin ramp rate) as a key to find an entry in the table corresponding to an approximately matching ramp rate value. In other words, the ramp rate may be used as a key in a key-value pair to select an entry in the table. The examples above use a look-up table as the data structure, but the scope of embodiments is not so limited. Other embodiments may use different data structures as appropriate.

At action 730, the thermal management unit selects a first voltage reduction step value corresponding to the particular temperature information rate of change value in the data structure. An example is provided above with respect to FIG. 4, wherein each of the voltage reduction step values in the left-hand column corresponds to a respective ramp rate value in the right-hand column. Action 730, the thermal management unit selects a voltage reduction step value in response to the parsing of action 720.

At action 740, the thermal management unit applies the first voltage reduction step value to the temperature mitigation algorithm. For instance, the thermal management unit may store an indication of the first voltage reduction step value in nonvolatile memory in a chip of the computing device.

At action 750, the thermal mitigation unit reduces performance of the computing device according to the temperature mitigation algorithm during normal operation of the computing device. In one example, the temperature mitigation algorithm is a software algorithm that initiates itself at power-up of the device by reading nonvolatile memory addresses within the computer chip to gather the settings from calibration. One of those settings is the first voltage reduction step value. The other settings may include, e.g., $T_J$ set points and shutdown points, Tskin set points, temperature sensor polling rates, and the like, also stored in nonvolatile memory addresses.

Action 750 includes reducing the energy consumed by at least one integrated circuit chip of the computing device. In one example, the temperature mitigation algorithm reduces an operating voltage of one or more integrated circuit chips, thereby reducing power consumption. However, the scope of embodiments may include any appropriate temperature mitigation technique, such as reducing an operating frequency whether as a part of the voltage reduction or independently of the voltage reduction.

As the device operates during normal use, the thermal management unit runs a temperature mitigation algorithm in the background, taking appropriate action as junction temperature set points and skin temperature set points are passed in either increasing temperature readings or decreasing temperature readings. Therefore, as a human user leaves the device idle, makes phone calls, sends text messages, watches videos, and the like, the thermal management unit continually runs the calibrated temperature mitigation algorithm to ensure that device operating temperatures do not violate skin limits.

The scope of embodiments is not limited to the specific method shown in FIG. 7. Other embodiments may add, omit, rearrange, or modify one or more actions. For instance, method 700 may include performing action 750 repeatedly during normal operation, whether or not actions 710-740 are repeated.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method comprising:
generating temperature information from a plurality of temperature sensors within a computing device;
storing a plurality of voltage reduction step values, each voltage reduction step value being associated with a frequency reduction step value and a temperature information rate of change value; and
processing the temperature information to generate voltage reduction steps based on an observed rate of change of the temperature information, wherein processing the temperature information comprises:
matching the observed rate of change of the temperature information to a particular stored temperature information rate of change value;
selecting a stored first voltage reduction step value corresponding to the particular stored temperature information rate of change value; and
reducing an operating voltage of the computing device by the stored first voltage reduction step value.

2. The method of claim 1, further comprising:
lowering a performance of the computing device during normal operation of the computing device, and in response to further temperature information received during normal operation of the computing device.

3. The method of claim 2, wherein lowering the performance of the computing device comprises reducing a frequency of operation of the computing device in addition to reducing a voltage of operation of the computing device.

4. The method of claim 2, wherein lowering the performance of the computing device comprises reducing an operating voltage of the computing device according to voltage reduction steps in a temperature mitigation algorithm.

5. The method of claim 1, wherein the voltage reduction steps are associated with respective frequency reduction steps.

6. The method of claim 1, wherein the observed rate of change of the temperature information comprises:
a rate of change of temperature information associated with a junction temperature of the computing device.

7. The method of claim 6, wherein the junction temperature of the computing device comprises a reading of a first temperature sensor of a plurality of temperature sensors of the device, wherein the reading is a highest reading of the plurality of temperature sensors.

8. The method of claim 1, wherein:
the plurality of voltage reduction step values are stored as voltage deltas in the data structure; and
the associated frequency reduction step values and associated temperature information rate of change values are stored in the data structure.

9. The method of claim 8, wherein the data structure comprises a look-up table.

10. The method of claim 8, wherein matching the observed rate of change of the temperature information comprises:
parsing the data structure to match the observed rate of change of the temperature information to the particular stored temperature information rate of change value in the data structure.

11. The method of claim 10, further comprising:
using the first voltage reduction step value during normal operation of the computing device.

12. A system comprising:
a computer processor configured to execute computer-readable instructions, the computer processor being installed in a computing device; and
a plurality of temperature sensors disposed within the computing device, the plurality of temperature sensors configured to communicate with the computer processor, the computer processor configured to perform the following operation:
gathering temperature data from the plurality of temperature sensors internal to a housing of the computing device during a first period of time;
measuring a temperature ramp rate of the computing device from the temperature data;
using the temperature ramp rate as a key to select a value from a data structure, wherein the value includes a voltage step size; and
reducing an operating voltage of the computing device by the voltage step size.

13. The system of claim 12, wherein the plurality of temperature sensors are disposed on a printed circuit board of the computing device, and wherein the printed circuit board is enclosed within a housing of the computing device.

14. The system of claim 12, wherein the plurality of temperature sensors are enclosed within a housing of the computing device.

15. The system of claim 12, wherein the temperature ramp rate comprises a rate of change of a junction temperature during a calibration operation of the computing device.

16. The system of claim 12, wherein the computer processor is further configured to reduce an operating voltage of the computer processor according to the voltage step size during normal operation.

17. A computing device comprising:
means for sensing temperature at a plurality of locations within an external housing of the computing device;
means for calculating a junction temperature ramp rate from temperature data from the temperature sensing means;
means for parsing a look-up table to select a voltage reduction step size value based on the junction temperature ramp rate; and
means for reducing an operating voltage by the voltage reduction step size value.

18. The computing device of claim 17, wherein the means for calculating the junction temperature ramp rate comprises:
a plurality of temperature sensors, wherein a first subset of the plurality of temperature sensors are disposed within a semiconductor chip of the computing device, and wherein a second subset of the plurality of temperature sensors are disposed on a printed circuit board of the computing device.

19. The computing device of claim 17, further comprising:
means for storing the voltage reduction step size value in a non-volatile memory of the computing device.

20. The computing device of claim 19, further comprising:
means for retrieving the voltage reduction step size value from the non-volatile memory.

21. The computing device of claim 17, wherein the means for calculating the junction temperature ramp rate comprises:
means for polling the temperature sensing means to determine a highest temperature reading among the temperature sensing means; and means for generating the junction temperature ramp rate from the highest temperature reading among the temperature sensing means.

22. A method comprising:
gathering temperature data from a plurality of temperature sensors internal to a housing of a computing device during a first period of time;
measuring a temperature ramp rate of the computing device from the temperature data;
using the temperature ramp rate as a key to select a value from a data structure, wherein the value includes a voltage step size; and
reducing an operating voltage of the computing device by the voltage step size.

23. The method of claim 22, wherein gathering temperature data further comprises:
calculating a junction temperature as a highest temperature reading value of the plurality of temperature sensors as temperature data is gathered; and
wherein measuring the temperature ramp rate comprises measuring a ramp rate of the junction temperature.

24. The method of claim 22, wherein measuring the temperature ramp rate comprises:
calculating a skin temperature of the computing device; and
calculating a ramp rate of the skin temperature of the computing device.

25. The method of claim 22, wherein the voltage step size comprises a voltage delta.

26. The method of claim 22, wherein applying the voltage step size comprises:
parsing the data structure to match the measured temperature ramp rate to a ramp rate value in the data structure;
selecting the voltage step size corresponding to the ramp rate value in the data structure; and
storing the voltage step size in a data storage device in the computing device.

* * * * *